United States Patent

[11] 3,565,112

| [72] | Inventors | Reginal G. Sides<br>Orange, Calif.;<br>Elizabeth Y. Sides, Executrix of the<br>Estate of said Reginal Sides, deceased. |
|---|---|---|
| [21] | Appl. No. | 840,149 |
| [22] | Filed | July 9, 1969 |
| [45] | Patented | Feb. 23, 1971 |

[54] MEANS FOR WATER CONDITIONING
10 Claims, 3 Drawing Figs.

[52] U.S. Cl. .................................................. 137/599.1,
137/268, 137/562; 239/310, 239/25
[51] Int. Cl. ...................................................... B05b 7/26
[50] Field of Search.......................................... 137/205.5,
268, 599, 599.1, 562, 564.5, 603; 239/310, 312,
315, 316, 317

[56] References Cited
UNITED STATES PATENTS
3,011,725  12/1961  Shames et al. .................. 137/562X
3,091,402  5/1963  Palmer .......................... 239/317X
3,192,950  7/1965  Weese et al. .................. 137/564.5
FOREIGN PATENTS
641,215  8/1950  Great Britain ................. 137/562

*Primary Examiner*—Robert G. Nilson
*Attorney*—Robert E. Strauss

ABSTRACT: A readily detachable and compact plumbing fixture is provided for attachment to household faucets which comprises a sleeve that attaches to the faucet and has first and second ported areas with sealing members positioned between the ported areas with a yoke member surrounding the sleeve and having first and second collecting chambers about the ported areas in the sleeve. The yoke member also has a flow-diverting conduit communicating with the first collecting chamber and a flow-returning conduit communicating with the second collecting chamber. Hoses are connected to the conduits and communicate with a water-treating or conditioning means such as a portable water softener.

INVENTOR.
REGINAL G. SIDES

MEANS FOR WATER CONDITIONING

DESCRIPTION OF THE INVENTION

The invention relates to plumbing fixtures and means for water conditioning and, in particular, relates to a detachable flow-diverting and returning fixture for incorporation on typically household plumbing appliances such as faucets and shower heads. The invention also relates to the combination of such a fixture with portable water conditioning means.

There exists a need for a compact and portable, i.e., readily detachable water-conditioning unit for water softening and purifying. Essential to the success of such units is the development of a flow-diverting and returning attachment for household plumbing appliances such as faucets and shower heads which is compact and readily detachable without any structural modification to the existing household plumbing.

The compactness of such a flow-diverting and returning fixture is a particular requirement for successful application to faucets in sinks and basins which permit only a minimum of vertical clearance without unduly interfering with normal use.

It is an object of my invention to provide a compact flow-diverting and returning means.

It is also an object to provide said means as a readily detachable unit for typically household plumbing appliances.

It is a further object to provide said means as a highly compact unit.

It is an additional object to provide said means in combination with a portable water-conditioning means.

Other and related objects will be apparent from the following description of the invention.

The preceding objects are secured by my invention which comprises a sleeve member adapted to be secured to the discharge of a faucet with first and second ported areas disposed along its length; a sealing member positioned between the first and second ported areas to thereby block flow through the sleeve; and a yoke member surrounding the sleeve member with first and second collection chambers surrounding the first and second, respectively, ported areas of the sleeve and with a flow-diverting conduit communicating with the first collection chamber and a flow-returning conduit communicating with the second collection chamber. Modifications of this fixture include means permitting the removal and replacement of the sealing member in the sleeve, relief valve means in the device to bypass the flow diversion and permit direct discharge from the faucet when the back pressure through the water-conditioning means exceeds a predetermined value; and water fountain and actuating means communicating with at least one of the collecting chambers.

The invention will now be described with reference to the FIGS. of which:

Figure 1:
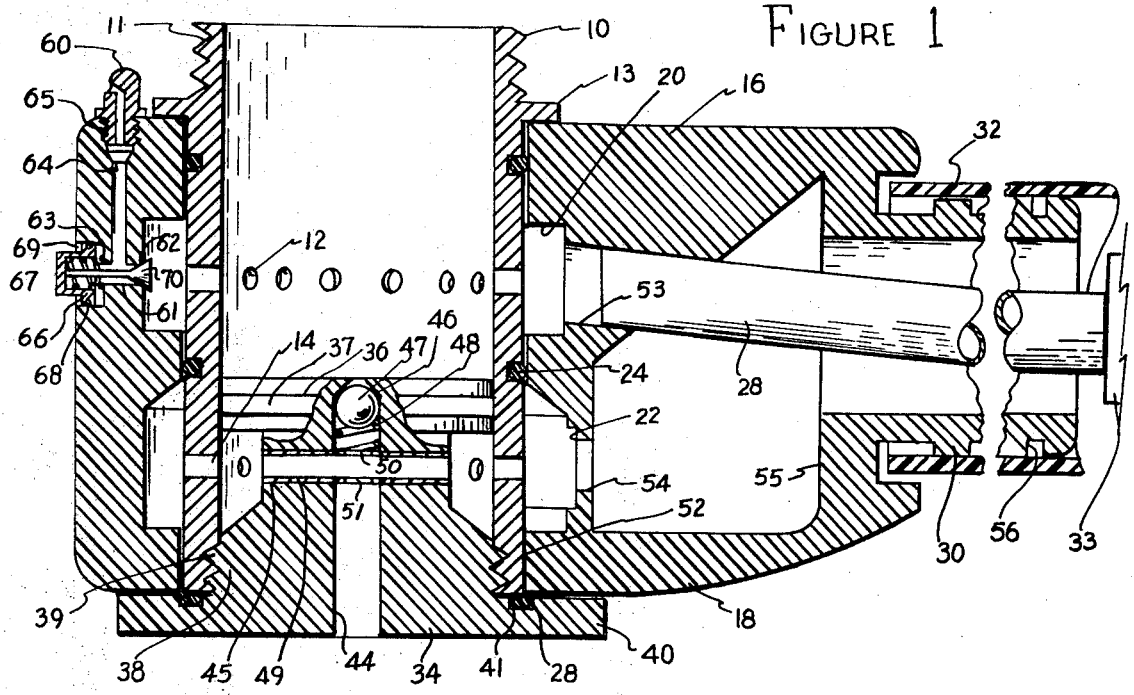
FIG. 1 illustrates the detachable appliance.

Referring now to FIG. 1, the unit can be briefly described as comprising a sleeve member 10 surrounded member 10 surrounded by yoke member 16 and fitted at its lower end with a sealing plug 34. The sleeve member has a first ported area, peripherally disposed ports 12, and a second ported area, peripherally disposed ports 14, with a solid or imperforate area therebetween. The yoke member which surrounds the sleeve has a first collection chamber, annular recess 20, and a second collection chamber, annular recess 22, which are positioned opposite the first and second ported areas of the sleeve. A flow diverting conduit 28 communicates with the first chamber and a flow returning conduit 30 communicates with the second chamber. The plug 34 has a sealing plate 36 which blocks flow through the sleeve between the first and second ported areas.

Considering the construction now in greater detail, the sleeve 10 has a threaded end 11 for removable attachment to the typical household plumbing fixtures and appliances. Alternative means that can be used include conventional expandable collars that can be used with faucets which don't have threaded discharges. Proximate the threads 11 is a collar 13 which can be an integral part of the sleeve as shown or which can have a threaded inner edge that engages the threads 11 of sleeve 10. Disposed along the length of the sleeve are the previously described peripheral rows of ports 12 and 14. Annular grooves 15 are provided as seats for sealing means 24, which can be conventional O-rings, upstream and downstream of the first pot ported area 12. The lower end of the sleeve is threaded with female threads to provide means for the removable attachment of plug 34.

Plug 34 serves to block flow through the sleeve between the first row of ports 12 and the second row of ports 14. The upper end of plug 34 is positioned between the rows of ports for this purpose and is grooved at 36 to seat a conventional O-ring 37. The portion of plug 34 which is positioned opposite the row of ports 14 has a neck 35 of reduced diameter which tapers into a neck 38 of enlarged diameter that has male threads 39 which engage the threaded lower end of sleeve 10. A longitudinal bore 44 is provided in plug 34 and it intersects transverse bore 45 to provide communication from the cavity surrounding neck 35. Bore 44 is extended to the upper face of plug 34 and is terminated therein to provide a tapered seat 46 for ball 47. This ball serves as a pressure relief valve and is biased into the closed position by spring 48. The spring can be retained in position by any suitable means, e.g., by sleeve 49 which is slipped into bore 45 and which has orifices 50 and 51 to permit fluid communication through the bores 44 and 45.

The base of plug 34 has a flange 40 with an annular groove 41 that overlaps the outer periphery of sleeve 10 when the plug is threaded onto the sleeve. This groove is a seat for O-ring 28 which seals the junction of the plug with the sleeve 10 and with body 16 of the yoke member. The O-ring also seals the junction between the sleeve 10 and yoke 16. Flange 40 supports yoke member 16 in the assembly and in engagement against collar 13.

Yoke member 16 is formed from body 18 which is preferably a single casting having a cavity 55 and a bore 52 which surrounds the sleeve 10. Annular grooves are provided in bore 52 which surrounds the sleeve 10. Annular grooves are provided in bore 52 which surrounds the sleeve 10. Annular grooves are provided in bore 52 which serve as the first and second collecting chambers 20 and 22. The opposite end of body 18 has a neck 30 which serves as the flow return conduit. Preferably, the neck is cast or subsequently grooved with grooves 56 to provide a surface for gripping hose 32. Bores 53 and 54 are provided to permit communication between the cavity 55 and chamber 22 to and to provide seating of conduit 28. Hose 33 engages the end of conduit 28 to provide a flow-diverting passage from the assembly.

An optional accessory that can be provided on the device is fountain or bubbler 60. This fountain can be provided to furnish treated or untreated water, as desired, by being connected to a tap to the second collecting chamber 22 or to the first collecting chamber 20. To install the fountain, bore 61 is drilled into the chamber 20 and provided with a beveled entrance into the chamber which serves as the seat for valve closure member 70. A counterbore 63 provides means for installing pushbutton 66 which is secured in bore 63 by retainer 69 that can be a spring snap washer or can be a threaded collar. A spring 67 biases the button 66 against the retainer 69 and an O-ring 68 can be used to seal the bore. The button bears against the shaft extension of the closure member 70 to open the valve when depressed. A bore 64 is drilled in body 10 to intersect bore 61 and is bored and tapped to receive the fountain or bubbler 60. When this valve is connected to chamber 20, it can also function as a high-pressure bleed or relief valve that can be actuated before disconnecting the fixture. This can be particularly of value when the attachment is used with an appliance which has its own shut-off valve on the water inlet, e.g., a portable dishwasher. With such a device, chamber 20 and hose 33 can often be under line pressure when, for instance, the appliance valve shuts off before the faucet valve is closed.

Figure 2:
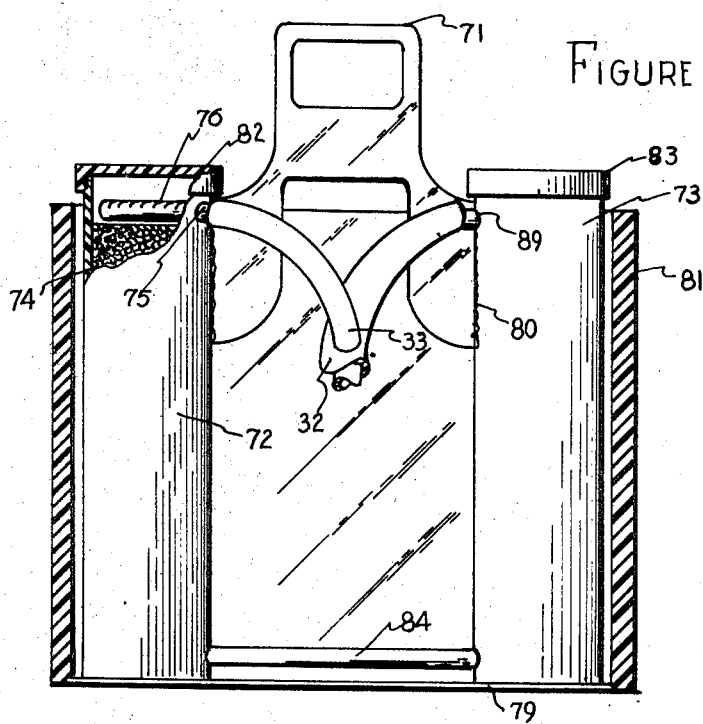
FIG. 2 illustrates a typical water-conditioning unit.

FIG. 2 illustrates the portable water conditioner for use in combination with the device of FIG. 1. This portable unit comprises a case 81 with a carrying handle 71 and a cover, not shown. The handle is connected to tanks 72 and 73 with cement 80. The tanks support columns of resin 74 and are closed with caps 82 and 83 which are turned onto threaded ends of the tanks. Water is introduced into the unit from hose 33 which is attached to inlet conduit and header 75. The header extends above the resin bed and is closed at its inside end and provided with a plurality of vertical cuts 76 to serve as a flow distributor. The cuts have a thickness of about 0.010 inch so that the resin particles which are approximately 0.014 inch average diameter do not pass into the conduit. The tanks are attached to base plate 79 which also is attached to the bottom of the walls of the case 81.

Conduit 84 extends between the lower ends of tanks 72 and 73 and is provided with vertical cuts similar to those of conduit 75 to permit flow from tank 72 and tank 73. A conduit 89 is provided at the top of the resin column in tank 73 on which is secured hose 32. Hose 32 is the outer hose of the concentric hoses 33 and 32 which are, respectively, the water supply and return lines of the unit. These are connected as previously described, to the flow diverting assembly; hose 33 being connected to conduit 28 and hose 32 being connected to the yoke member 16. If desired, a cutoff valve (not shown) can be installed in conduit 28 or at the inlet of header 75. Relief valve 47 can be set to open at slightly below the water-line pressure so that when the cutoff valve is closed, the relief valve serves as a bypass to discharge the untreated water directly through bore 44. Alternatively, and as shown, plug 34 is simply unthreaded from sleeve 10 and removed to permit full flow or discharge from sleeve 10.

Figure 3:
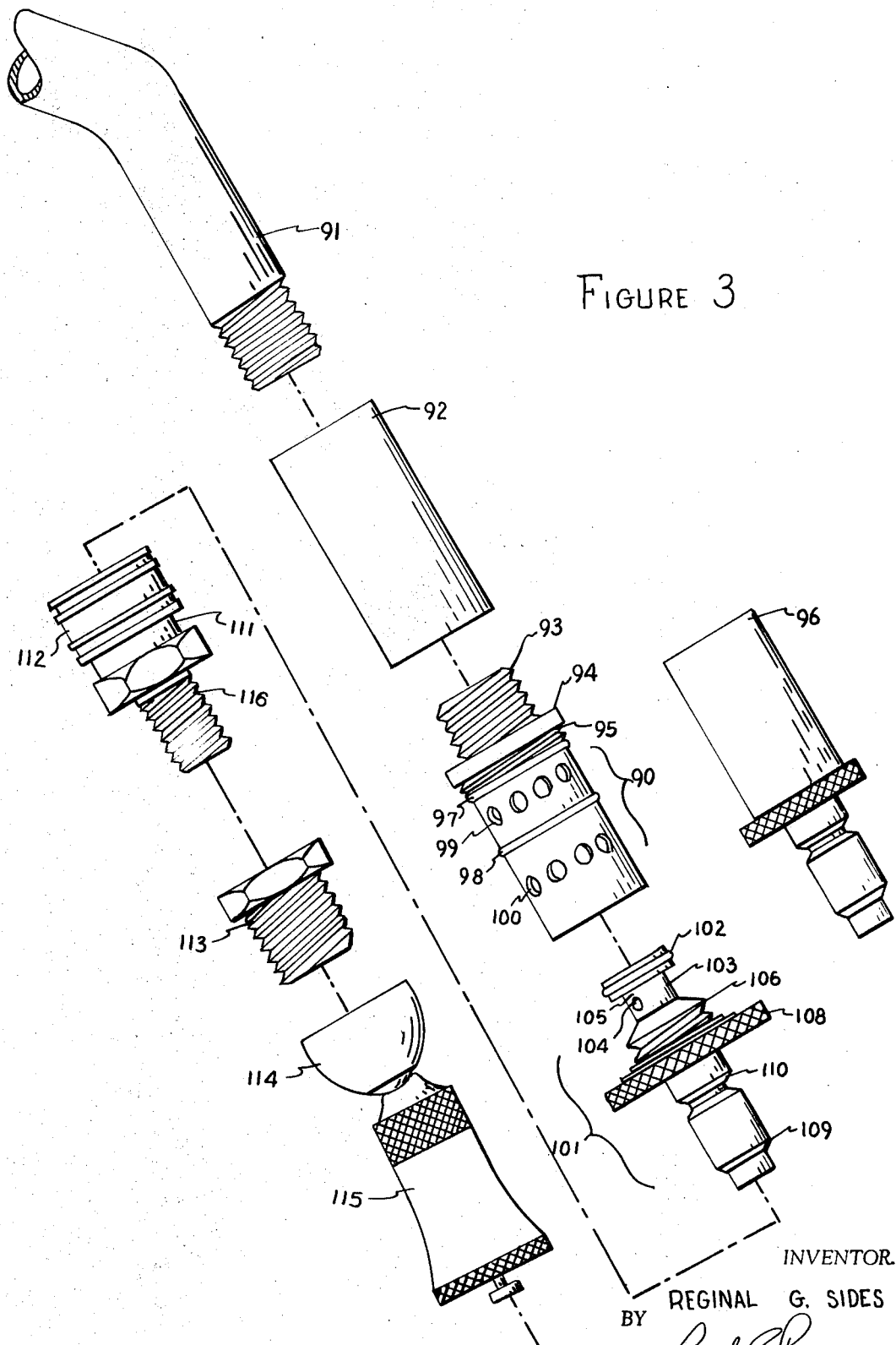
FIG. 3 illustrates the incorporation of the appliance in a typical shower head assembly.

FIG. 3 shows the adoption of the flow diverting and returning unit to a typical shower head. In this embodiment, the yoke member is the same as that described in FIG. 1 and this member is not illustrated again in FIG. 3. The sleeve member 90 is modified from that shown in FIG. 1. In this construction, the shower supply pipe 91 is fitted with a conventional coupling member 92. Sleeve 90 is provided with an upper end having male threads 93 for engagement in the coupling 92 and an integral collar 94. Beneath the collar are male threads 95 which can be engaged by the female threads of sleeve 96 when the yoke member 16 is removed from service. The remainder of sleeve 90 is similar to the construction of sleeve 10 as described in FIG. 1. It has the sealing O-rings 97 and 98 mounted in grooves that are spaced upstream and downstream of the first row of ports 99 with a second row of ports 100 located downstream of O-ring 98.

The plug member 101 has an upper end similar in construction to plug 34 of FIG. 1 with a sealing O-ring 102, neck 103, bore 104 and sleeve 105 all similar to the same elements in FIG. 1. The male threads 106 engage the threaded inner wall of the end of sleeve 90 and O-ring 107 is seated in a groove on the face of flange 108 to seal the plug and the yoke member in their juncture with the sleeve. At the base of the plug is the male member of a conventional quick-connecting coupling and in this regard, plug 101 differs from plug 34 of FIG. 1. This male coupling member has a seating surface 109 for engagement by a mating member with a groove 110 which is engaged by a plurality of balls carried by the mating member when it is locked on the male member.

The mating member of the quick-coupling unit is shown at 111 and comprises a sleeve 112 which slides on the member and is spring biased upwardly with an interior collar which forces balls carried by member 111 radially inwardly so that these balls will interlock in groove 110 of the male member. A typical unit for this service can be obtained from the Hansen Manufacturing Company of Cleveland, Ohio. A similar unit of quick-coupling means is shown in U.S. Pat. No. 3,011,725. The lower end of the coupling has male threads for engagement with a reducer 113 which fits the conventional upper end 114 of a shower head 115.

When the water conditioning unit is disconnected, the yoke member can be removed and sleeve 96 can be slide over sleeve 90 and turned onto threads 95. The lower end of sleeve 96 also has a male member of the quick-coupling unit similar to that shown for member 101. When this sleeve is placed over sleeve 90, member 111 and the assembly including the shower head can be installed.

While the invention has been described with reference to the presently contemplated preferred mode of practice, it is apparent that various equivalents for the illustrated structure can readily be substituted for those illustrated without departing from the scope of the invention.

I claim:

1. A fluid-flow-diverting and returning device for removable attachment to faucets that comprises: a sleeve-member-bearing faucet-engagement means at one end, first and second ported areas along its length; a yoke member having a transverse bore surrounding said sleeve member with first and second collecting chambers in said yoke member positioned contiguous with said bore and in juxtaposition to said first and second ported areas, respectively; a plurality of sealing means between said bore and said sleeve and positioned upstream and downstream of each of said collecting chambers; a flow-diverting conduit supported by said yoke member and communicating with said first collecting chamber; a flow-returning conduit supported by said yoke member and communicating with said second collecting chamber; and a plug member transversely disposed in said sleeve to seal against flow between said first and second ported areas in said sleeve.

2. The device of claim 1 wherein said ported areas comprise rows of peripherally disposed ports.

3. The device of claim 1 wherein said collecting chambers comprise annular groove in said bore through said yoke member.

4. The device of claim 1 wherein said plug member comprises a threaded base that is removably secured to the lower end of said sleeve member with a radially extending flange surface that supports said yoke member on said sleeve.

5. The device of claim 4 wherein said plug member has its upper end disposed between said first and second ported areas of said sleeve with a neck section of reduced diameter between said upper end and said base with at least one transverse bore through said neck and intersecting a longitudinal bore through said plug member.

6. The device of claim 1 wherein said plug member bears relief valve means set to open and permit flow through said sleeve between said first and second ported areas when the flow pressure through said fluid-diverting and returning device exceeds a predetermined value.

7. The device of claim 6 wherein said relief-valve means comprises a spring-biased valve-closure member carried by the upper end of said plug member and biased against a valve seat in said plug member.

8. The device of claim 1 wherein said plug member bears at its lower end one member of a quick-coupling pair of members.

9. The device of claim 1 wherein said sleeve bears, at its upper end, a collar for restraining the vertical movement of said yoke member.

10. The device of claim 9 wherein said sleeve member has means for the removable attachment of a concentric sleeve member in combination with a concentric sleeve member bearing at its lower end one member of a quick-coupling pair of members removably attached to said sleeve member.